United States Patent [19]
Kodaira et al.

[11] Patent Number: 6,008,584
[45] Date of Patent: Dec. 28, 1999

[54] HEADLAMP FOR A VEHICLE

[75] Inventors: Shigeru Kodaira; Toru Hasegawa; Hajime Tabata; Hiroyuki Morita; Mutsumi Katayama, all of Saitama, Japan

[73] Assignee: Honda Giken Kogyo Kabushiki Kaisha, Tokyo, Japan

[21] Appl. No.: 09/008,485

[22] Filed: Jan. 16, 1998

[30] Foreign Application Priority Data

Jan. 16, 1997 [JP] Japan ..................................... 9-005855
Jul. 7, 1997 [JP] Japan ..................................... 9-181511

[51] Int. Cl.⁶ .................................................. B60Q 1/02
[52] U.S. Cl. ................................ 315/82; 315/77; 362/80; 362/265; 362/273
[58] Field of Search ................................. 315/77, 80, 82; 362/61, 263, 265, 268, 273

[56] References Cited

U.S. PATENT DOCUMENTS

| | | | |
|---|---|---|---|
| 3,993,388 | 11/1976 | Konzorr | 439/459 |
| 4,841,419 | 6/1989 | Ohishi | 362/226 |
| 4,920,459 | 4/1990 | Rothwell, Jr. et al. | 362/61 |
| 5,188,444 | 2/1993 | Makita et al. | 362/80 |
| 5,597,232 | 1/1997 | Ohashi et al. | 362/265 |

*Primary Examiner*—Haissa Philogene
*Attorney, Agent, or Firm*—Birch, Stewart, Kolasch & Birch, LLP

[57] ABSTRACT

A headlamp for a vehicle includes a lamp housing having an opening portion; a discharge lamp removably contained in the lamp housing; and a lighting circuit unit, mounted in such a manner so as to cover the opening portion from a rear surface side of the lamp housing, for lighting the discharge lamp. A plug is separated from a cord connector when the lighting circuit unit is removed from the lamp housing. Thus, when the work of removing the lighting circuit unit is completed, the plug is necessarily separated from the cord connector, to thereby cut off the power supply to the lighting circuit unit.

14 Claims, 9 Drawing Sheets

HEADLAMP FOR A VEHICLE

BACKGROUND OF THE INVENTION

1. Field of the Invention

The present invention relates to an improved headlamp for a vehicle, which is of a type containing a discharge lamp.

2. Description of Related Art

A headlamp for a vehicle is known, for example, from Japanese Patent Publication No. 2542962 entitled "Headlamp for Vehicle." The technique, as shown in FIG. 1 of this patent publication, describes a headlamp 1 for a vehicle, which includes a lamp housing 2 in which an opening on a front surface side thereof is covered with a lens and a rear surface thereof has an opening. A discharge lamp 8 is disposed in the lamp housing 2, wherein a lighting circuit 27 for lighting the discharge lamp 8 is provided in the opening provided in the rear surface of the lamp housing 2. The discharge lamp 8 is required to be applied with a high voltage, so that a low voltage is converted into a high voltage by the lighting circuit 27.

On the other hand, manual work is sometimes required to be performed in a lamp housing for the exchange of a discharge lamp. In a headlamp of a type in which a lighting switch is omitted, such manual work must be performed with care taken not to touch a portion that is applied with a high voltage. In other words, a lighting circuit is not configured to be cut off whenever work is performed.

SUMMARY AND OBJECTS OF THE INVENTION

An object of the present invention is to provide a headlamp for a vehicle, which is capable of cutting off a lighting circuit whenever work is performed in the lamp housing.

To achieve the above object, according to the present invention, there is provided a headlamp for a vehicle including: a lamp housing with a front surface side thereof which is covered with a lens. The lamp housing includes an opening portion in a rear surface thereof. A discharge lamp is removably contained in the lamp housing. A lighting circuit unit, mounted in such a manner so as to cover the opening portion from the rear surface side of the lamp housing, is provided for lighting the discharge lamp. A cord connector and a plug are provided between the lighting circuit unit and the lamp housing, whereby when the lighting circuit unit is removed from the lamp housing, the cord connector is separated from the plug to thereby cut off supply of a power from a power supply to the lighting circuit unit.

With this configuration, when the lighting circuit unit is removed from the lamp housing, the plug can be simultaneously removed from the cord connector. As a result, when the work of removing the lighting circuit unit is completed, the plug is necessarily separated from the cord connector, to thereby cut off the power supply to the lighting circuit unit.

According to the invention, there is provided a headlamp for a vehicle, wherein the cord connector or the plug is directly connected to the lighting circuit unit.

The cord connector or the plug is directly mounted on the lighting circuit unit. Accordingly, when the lighting circuit unit is removed from the lamp housing, the power supply to the lighting circuit unit can be immediately cut off in interlocking with the operation of removing the lighting circuit unit from the lamp housing.

According to the present invention, there is provided a headlamp for a vehicle, wherein in addition to a cable coupler composed of the cord connector and the plug for supplying power from the power supply to the lighting circuit unit, there is another cable coupler at a position on a power supply side from the cable coupler in order to removably connect the headlamp to a vehicle main body.

Since in addition to a cable coupler composed of the cord connector and the plug for supplying power from the power supply to the lighting circuit unit, there is another cable coupler at a position on a power supply side from the cable coupler in order to removably connect the headlamp to a vehicle main body, the power supply to the lighting circuit unit can be cut off before removal of the lighting circuit unit from the lamp housing.

According to the present invention, there is provided a headlamp for a vehicle including: a lamp housing with a front surface side thereof which is covered with a lens. The lamp housing includes an opening portion in a rear surface thereof. A discharge lamp is removably contained in the lamp housing. A lighting circuit unit, mounted in such a manner so as to cover the opening portion from the rear surface side of the lamp housing, is provided for lighting the discharge lamp. A plurality of fastening members are provided for mounting the lighting circuit unit to the lamp housing. A plug or a cord connector is mounted at a position where it covers at least one of the fastening members. A harness is provided for supplying power from a power supply to the lighting circuit unit through a cable coupler composed of the plug and the cord connector.

To remove the lighting circuit unit from the lamp housing, it is required to release the fastening members mounting the lighting circuit unit to the lamp housing. In the present invention, one of the fastening members cannot be released unless the plug or the cord connector is removed. As a result, since the step of removing the harness for supplying power from the power supply to the lighting circuit unit is necessarily included in the step of removing the lighting circuit unit from the lamp housing, maintenance in the lamp housing can be performed even by a person not skilled in the removing procedure.

According to the present invention, there is provided a headlamp for a vehicle including: a lamp housing with a front surface side thereof which is covered with a lens. The lamp housing includes an opening portion in a rear surface thereof. A discharge lamp is removably contained in the lamp housing. A lighting circuit unit is mounted in such a manner so as to cover the opening portion from the rear surface side of the lamp housing, for lighting the discharge lamp. A plurality of fastening members are provided for mounting the lighting circuit unit to the lamp housing. A harness is provided for supplying power from a power supply to the lighting circuit unit. An earth wire is provided in the harness, which is co-fastened with at least one of the fastening members.

To remove the lighting circuit unit from the lamp housing, it is required to release the fastening members mounting the lighting circuit unit to the lamp housing. In the present invention, since the earth wire in the harness is co-fastened with at least one of the fastening members, the earth wire can be removed when the fastening members are released. As a result, since the step of removing the earth wire in the harness is necessarily included in the step of removing the lighting circuit unit from the lamp housing, it is possible to automatically cut off the power supply to the lighting circuit unit.

According to the present invention, there is provided a headlamp for a vehicle, wherein a cable coupler is connected to the harness, and the fastening member co-fastened with the earth wire is covered with a plug or a cord connector of the cable coupler.

Since the cable coupler is connected to the harness and the fastening member co-fastened with the earth wire is covered with a plug or a cord connector of the cable coupler, the step of removing the plug or cord connector of the cable coupler and the earth wire is included in the step of removing the lighting circuit unit from the lamp housing. As a result, by removal of the lighting circuit unit from the lamp housing, the entire harness is removed from the lighting circuit unit, to thereby make the maintenance of the headlamp for a vehicle easier.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, embodiments of the present invention will be described with reference to the accompanying drawings. In addition, the drawings should be viewed in the direction of characters.

Figure 1:
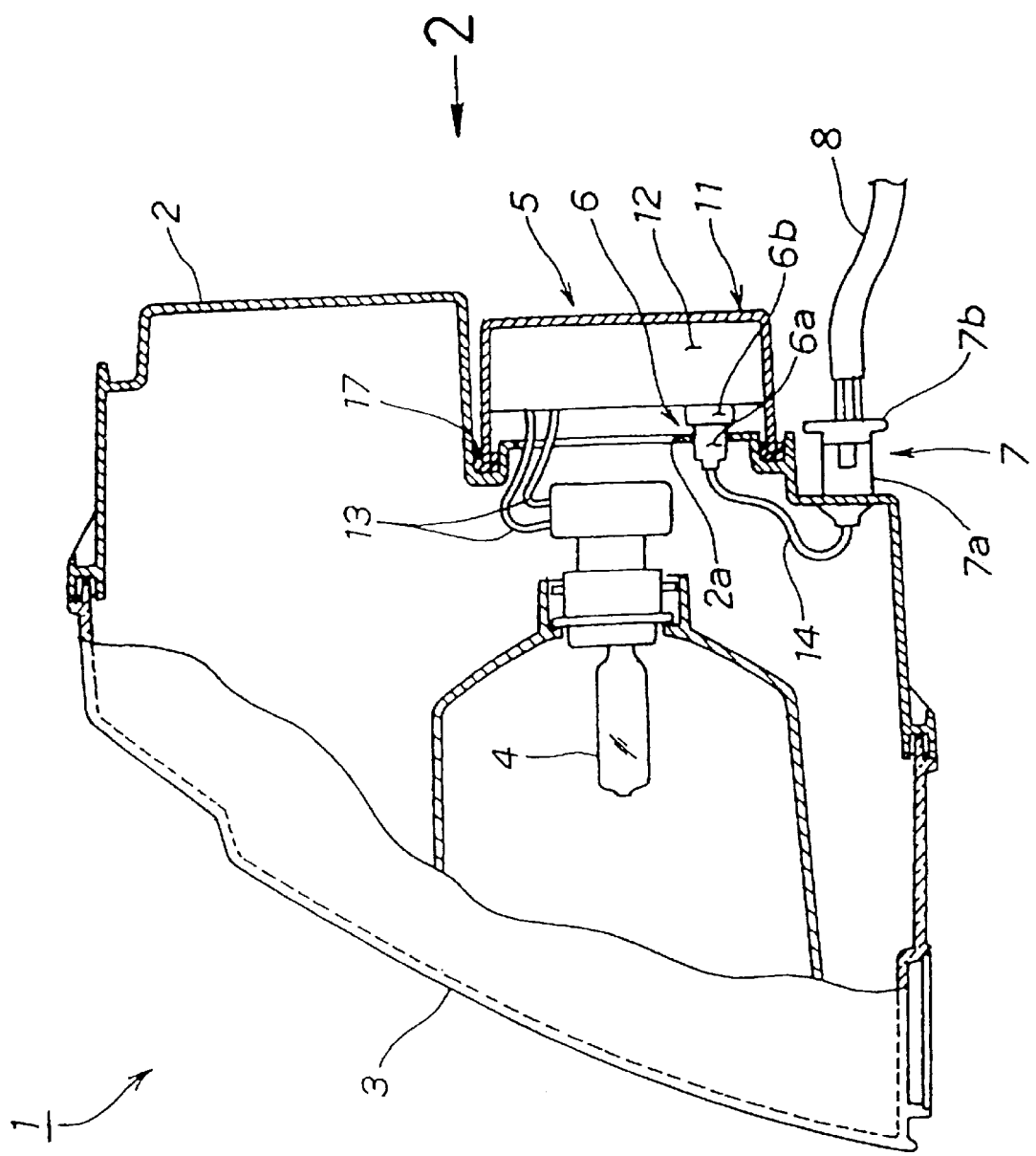
FIG. 1 is a side view of a first embodiment of a headlamp for a vehicle according to the present invention.

FIG. 1 is a side view of a first embodiment of a headlamp for a vehicle according to the present invention. A headlamp 1 for a vehicle includes a lamp housing 2; a lens 3 provided for covering a front surface side of the lamp housing 2; a discharge lamp 4 removably contained in the lamp housing 2 at a position within the lens 3 and a lighting circuit unit 5, mounted in such a manner so as to cover an opening portion 2a provided in a rear surface of the lamp housing 2, for lighting the discharge lamp 4. A cable coupler 6 is provided in the lamp housing 2 for supplying a power from a power supply to the lighting circuit unit 5. A power supply cable coupler 7 is provided as a second cable coupler, provided outside the lamp housing 2, for relaying power from the power supply to the cable coupler 6. A harness 8 is connected to the power supply cable coupler 7 for supplying power from the power supply to the power supply cable coupler 7.

The lighting circuit unit 5 includes a circuit case 11, and a circuit main body 12, provided in the circuit case 11, for lighting the discharge lamp 4. The fighting circuit unit 5 also has two high voltage cords 13 for supplying a high voltage to the discharge lamp 4.

The cable coupler 6 is composed of a cord connector 6a mounted in the housing 2, and a plug 6b which is fitted in the cord connector 6a and mounted in the circuit main body 12. The cord connector 6a includes a relay harness 14 for relaying power from the power supply to the cord connector 6a.

The power supply cable coupler 7 is composed of a cord connector 7a connected to one end of the relay harness 14 and mounted to an outer surface of the lamp housing 2, and a plug 7b which is fitted in the cord connector 7a and connected to the harness 8. In addition, the power supply cable coupler 7 is disposed on the power supply side from the cable coupler 6 and is adapted to removably connect the headlamp 1 to a vehicular main body (not shown).

Figure 2:
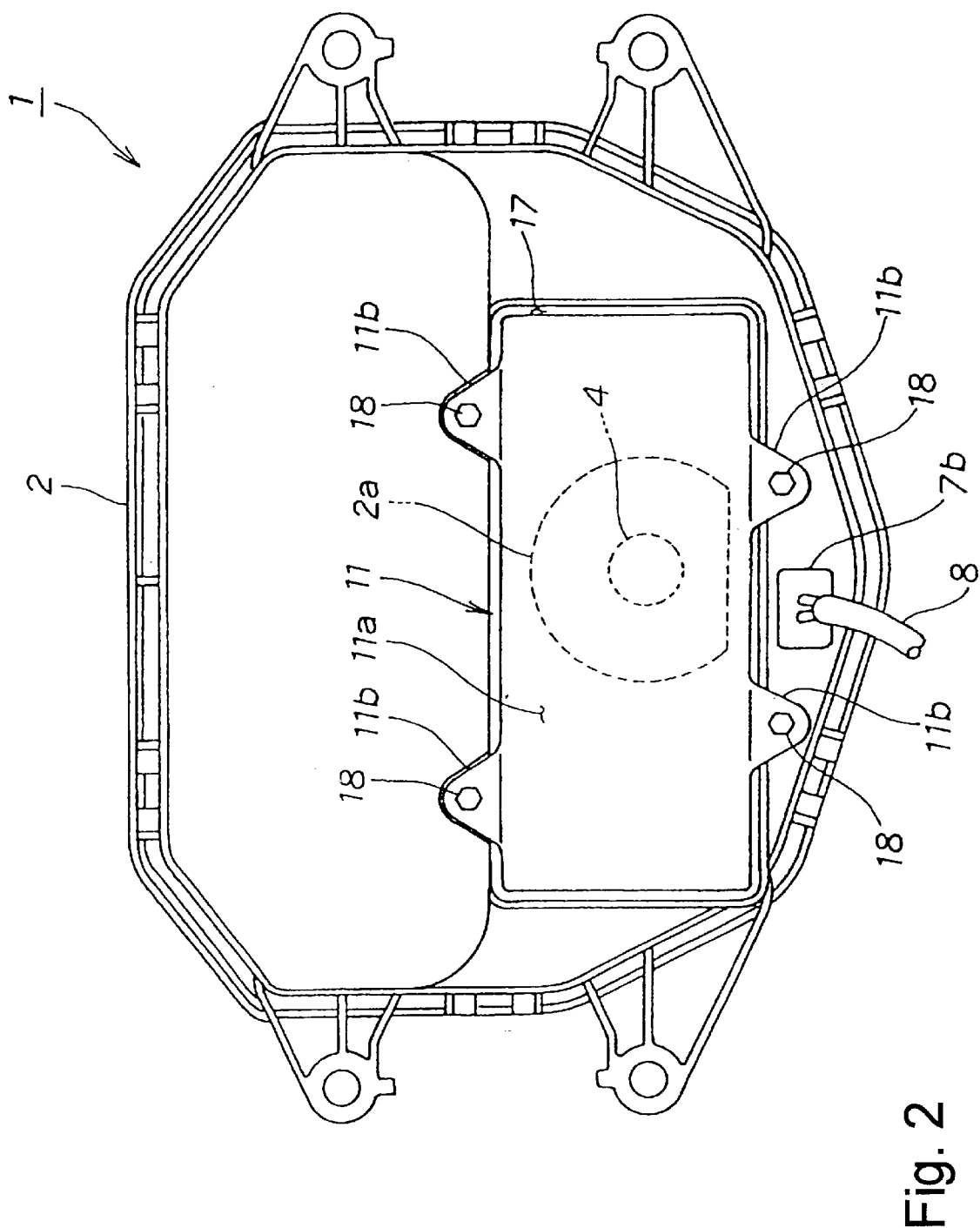
FIG. 2 is a view taken along arrow 2 of FIG. 1.

FIG. 2 is a plan view, taken along arrow 2 of FIG. 1, showing the first embodiment of the headlamp for a vehicle according to the present invention.

The circuit case 11 is composed of a case main body 11a, and a plurality of mounting portions 11b for mounting the case main body 11a to the housing 2.

The circuit case 11 is removably mounted to the lamp housing 2 through a seal member 17 with a plurality of mounting screws 18.

Figure 3A:
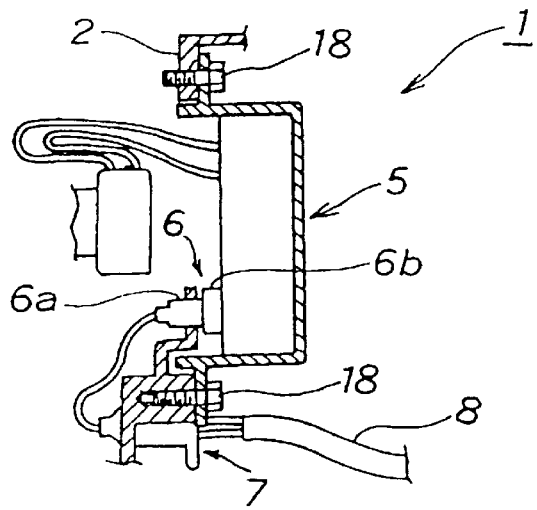
FIGS. 3(a) to 3(c) are views illustrating a function of the first embodiment of the headlamp for a vehicle according to the present invention.
Figure 3B:
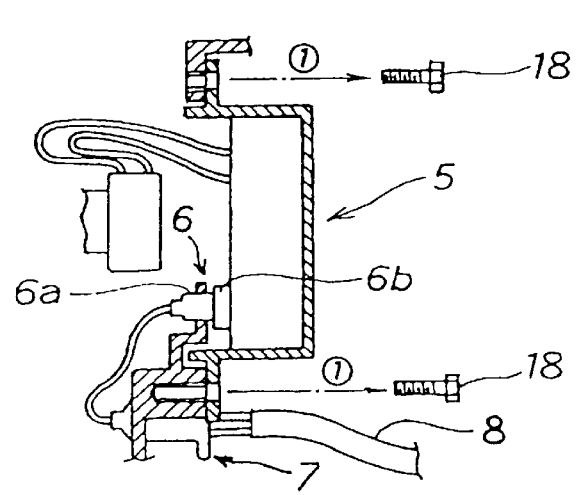
Figure 3C:
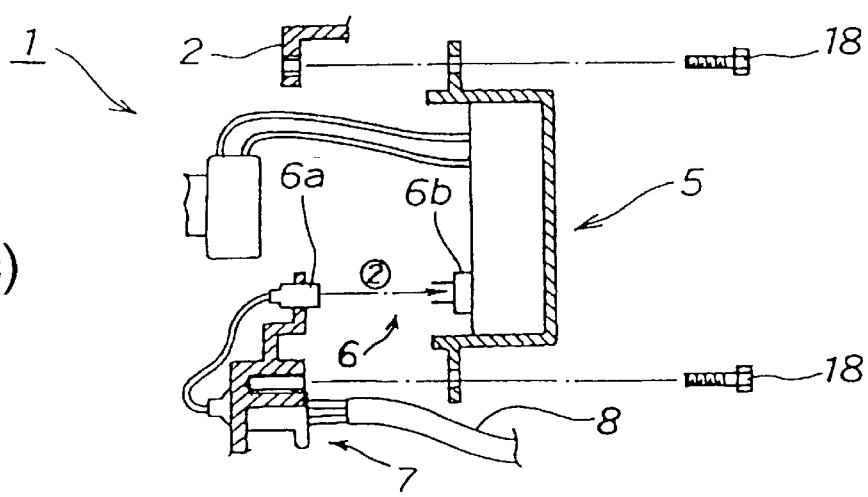

The function of the headlamp 1 for a vehicle having the above configuration will be described below. FIGS. 3(a) to 3(c) are views illustrating the flnction of the first embodiment of the headlamp for a vehicle according to the present invention.

FIG. 3(a) shows the headlamp 1 for a vehicle in a state in which the lighting circuit unit 5 has been mounted to the lamp housing 2. As shown in FIG. 3(b), the mounting screws 18 are removed from the lamp housing 2 in the direction shown by arrows (1). FIG. 3(c) illustrates the headlamp 1 for a vehicle in a state after the lighting circuit unit 5 is removed from the lamp housing 2 in the direction shown by arrow (2).

When the lighting circuit unit 5 is removed from the lamp housing 2, the cord connector 6a of the cable coupler 6 is separated from the plug 6b of the cable coupler 6. Accordingly, when the work of removing the lighting circuit unit 5 is completed, the plug 6b is necessarily separated from the cord connector 6a, to thereby cut off the power supply to the lighting circuit unit 5.

The cord connector 6a is directly mounted to the lamp housing 2 and the plug 6b is directly mounted to the lighting circuit unit 5. Accordingly, when the lighting circuit unit 5 is removed from the lamp housing 2, the power supply to the lighting circuit unit 5 can be immediately cut off in interlocking with the operation of removing the lighting circuit unit 5 from the lamp housing 2.

In addition to the cable coupler 6 composed of the cord connector 6a and the plug 6b for supplying power from the power supply to the lighting circuit unit 5, there is provided the power supply cable coupler 7 on the power supply side from the cable coupler 6 for removably connecting the headlamp 1 to the vehicular main body (not shown), so that it is possible to cut off the power supply to the lighting circuit unit 5 before removal of the lighting circuit unit 5 from the lamp housing 2.

In the case where the entire lamp housing 2 is required to be removed from the vehicular main body (not shown), the power supply can be cut off only by removing the power supply cable coupler 7 from the lamp housing 2, and in this case, it is not required to remove the lighting circuit unit 5 from the lamp housing 2 for cutting off the power supply.

Figure 4:
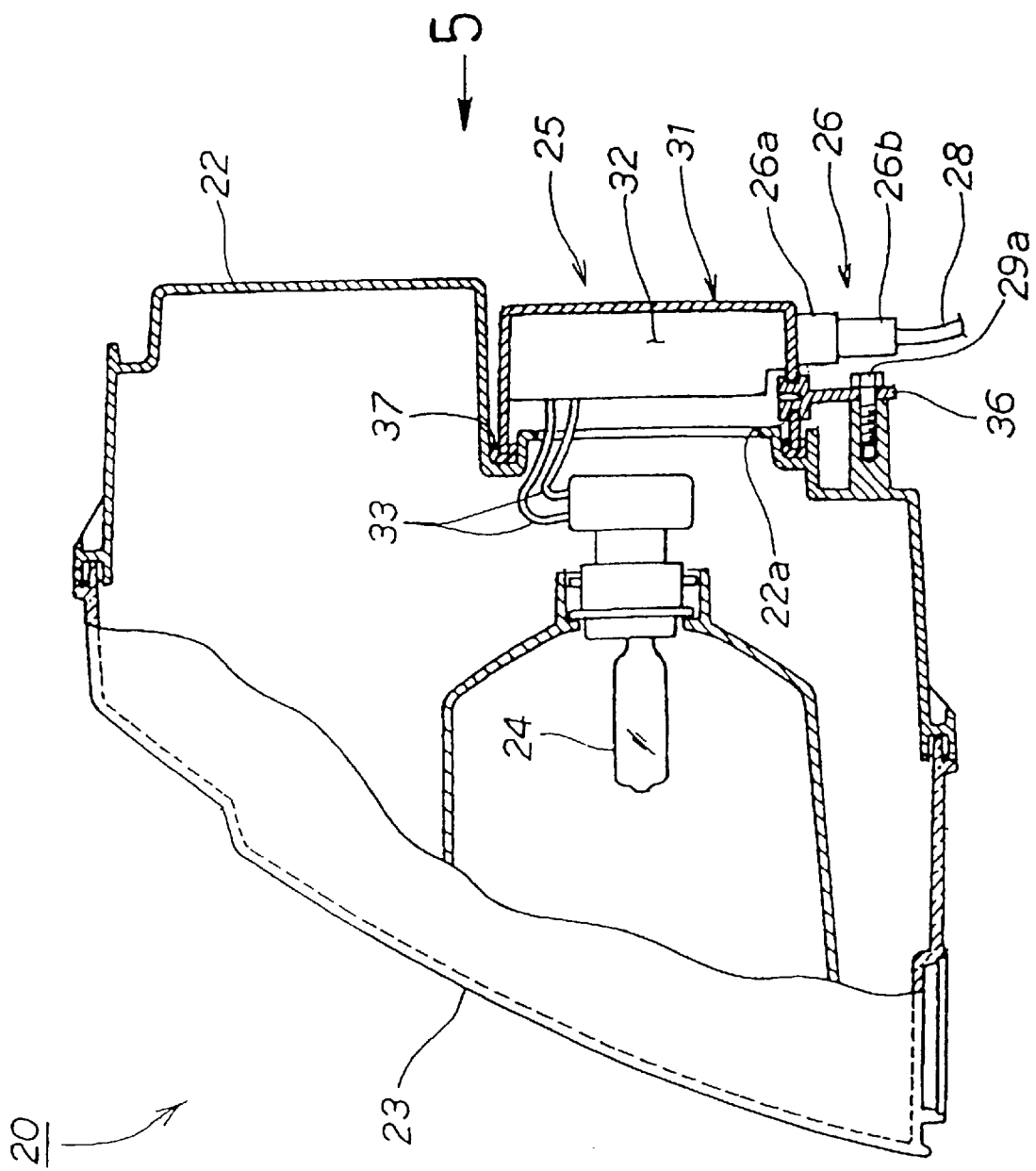
FIG. 4 is a side view of a second embodiment of the headlamp for a vehicle according to the present invention.

FIG. 4 is a side view of a second embodiment of the headlamp for a vehicle according to the present invention. A headlamp 20 for a vehicle includes a lamp housing 22; a lens 23 for covering a front surface side of the lamp housing 22; a discharge lamp 24 removably contained in the lamp housing 2 at a position within the lens 23 and a lighting circuit unit 25, mounted in such a manner so as to cover an opening portion 22a provided in a rear surface of the lamp housing 22, for lighting the discharge lamp 24. A cable coupler 26, connected to the lighting circuit unit 25, is provided for supplying power from a power supply to the lighting circuit unit 25. A harness 28 is connected to the cable coupler 26, for supplying power from the power supply to the cable coupler 26. A mounting screw 29a and a plurality of mounting screws 29b are provided as fastening members for mounting the lighting circuit unit 25 to the lamp housing 22. See FIG. 5.

The lighting circuit unit 25 is composed of a circuit case 31, and a circuit main body 32, provided in the circuit case 31, for lighting the discharge lamp 24. The lighting circuit unit 25 also has two high voltage cords 33 for supplying high voltage to the discharge lamp 24.

The cable coupler 26 is composed of a cord connector 26a and a plug 26b. The cord connector 26a is mounted to the circuit main body 32 in such a manner so as to pass through the case 31, for supplying power from the power supply to the circuit main body 32. The plug 26b is fitted in the cord connector 26a and is mounted to the harness 28.

Figure 5:
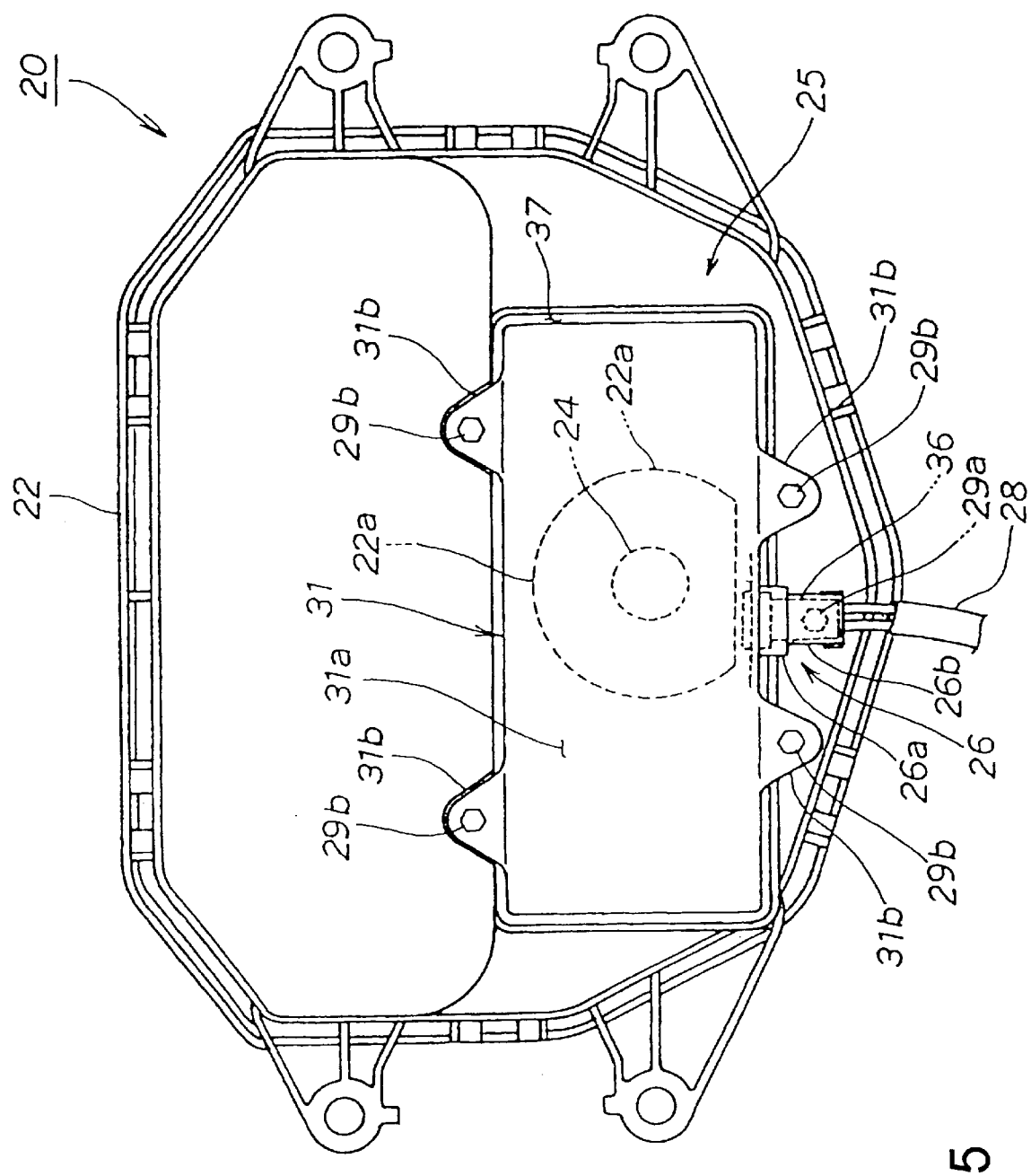
FIG. 5 is a view taken along arrow 5 of FIG. 4.

FIG. 5 is a plan view, taken along arrow 5 of FIG. 4, showing the second embodiment of the headlamp for a vehicle according to the present invention.

The circuit case 31 is composed of a case main body 31a, a plurality of mounting portions 31b for mounting the case main body 31a to the housing 22, and a presser plate 36 for mounting the case main body 31a to the lamp housing 22 in co-operation of the mounting portions 31b. The circuit case 31 is mounted on the lamp housing 22 through a seal member 37, and in such a state, the mounting portions 31b are fixed on the lamp housing 22 with the mounting screws 29b and also the presser plate 36 is fixed on the lamp housing 22 with the mounting screw 29a.

To remove the lighting circuit unit 25 from the lamp housing 22, it is required to release the fastening members mounting the lighting circuit unit 25 to the lamp housing 22. However, the plug 26b of the cable coupler 26, connected to the harness 28 for supplying a power to the lighting circuit unit 25, is located at a position where the plug 26b covers the mounting screw 29a, so that the mounting screw 29a cannot be released unless the plug 26b is removed.

Figure 6:
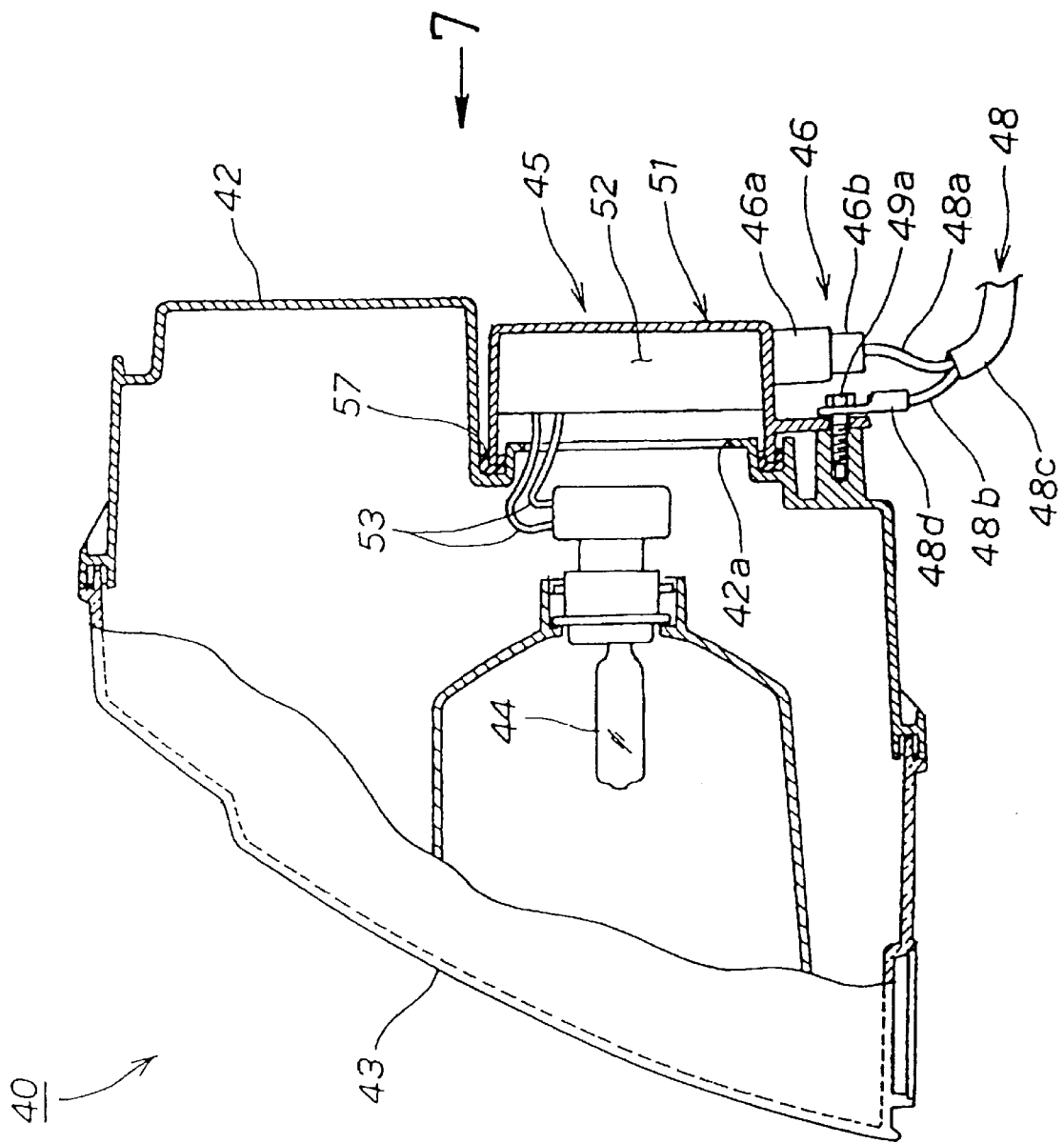
FIG. 6 is a side view of a third embodiment of the headlamp for a vehicle according to the present invention.

FIG. 6 is a side view of a third embodiment of the headlamp for a vehicle according to the present invention. A headlamp 40 for a vehicle includes a lamp housing 42; a lens 43 provided for covering a front surface side of the lamp housing 42; a discharge lamp 44 removably contained in the lamp housing 42 at a position within the lens 43; a lighting circuit unit 45, mounted in such a manner so as to cover an opening portion 42a provided in a rear surface of the lamp housing 42, for lighting the discharge lamp 44 and a cable coupler 46, connected to the lighting circuit unit 45, for supplying power from a power supply to the lighting circuit unit 45. A harness 48, connected to the cable coupler 46, is provided for supplying power from the power supply to the cable coupler 46. A mounting screw 49a and a plurality of mounting screws 49b are provided as fastening members for mounting the lighting circuit unit 45 on the lamp housing 42. See FIG. 7.

The lighting circuit unit 45 is composed of a circuit case 51, and a circuit main body 52, provided in the circuit case 51, for lighting the discharge lamp 44. The lighting circuit unit 45 also has two high voltage cords 53 for supplying high voltage to the discharge lamp 44.

The cable coupler 46 is composed of a cord connector 46a and a plug 46b. The cord connector 46a is mounted to the circuit main body 52 in such a manner so as to pass through the circuit case 51, for supplying power from the power supply to the circuit main body 52. The plug 46b is fitted in the cord connector 46a and mounted to the harness 48.

Figure 7:
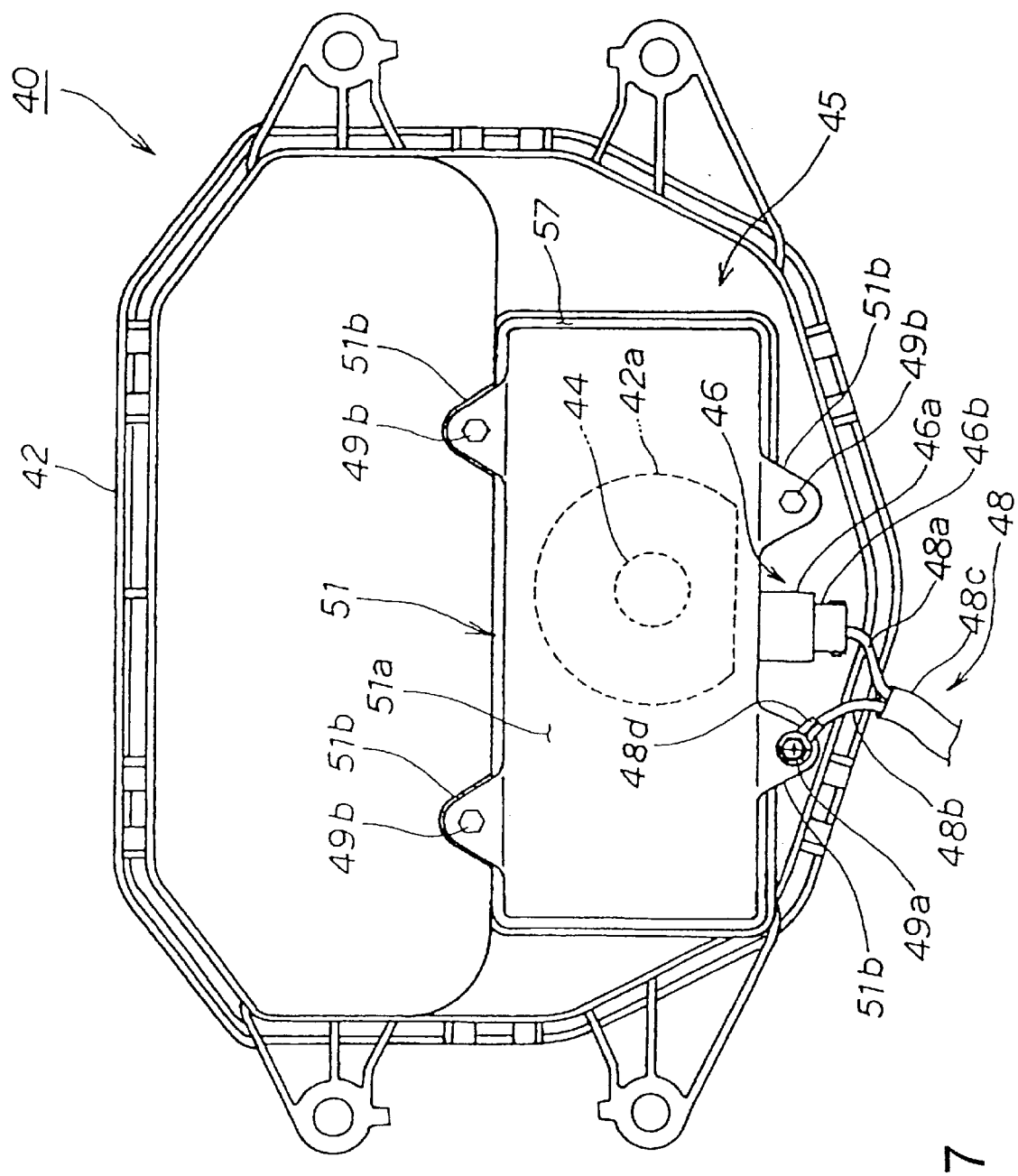
FIG. 7 is a view taken along arrow 7 of FIG. 6.

FIG. 7 is a plan view, seen from an arrow 7 of FIG. 6, showing the third embodiment of the headlamp for a vehicle according to the present invention.

The harness 48 is composed of a plus side cord 48a, an earth side cord 48b, and a covering portion 48c for covering the cords 48a and 48b. The plug 46b is provided at the leading end of the plus side cord 48a, and an earth terminal 48d is provided at the leading end of the earth wire 48b. The earth terminal 48d is co-fastened with the circuit case 51 by means of the mounting screw 49a when the circuit case 51 is mounted on the lamp housing 42.

The circuit case 51 is composed of a case main body 51a, and a plurality of mounting portions 51b for mounting the case main body 51a on the lamp housing 42. The circuit case 51 is mounted on the lamp housing 42 through a seal member 57 with the mounting screws 49a and 49b.

To remove the lighting circuit unit 45 from the lamp housing 42, the mounting screws 49a and 49b mounting the lighting circuit unit 45 on the lamp housing 42 are released. The earth wire 48b in the harness is co-fastened with the mounting screw 49a. Accordingly, when the mounting screw 49a is released, the earth wire 48b is simultaneously removed.

Figure 8:
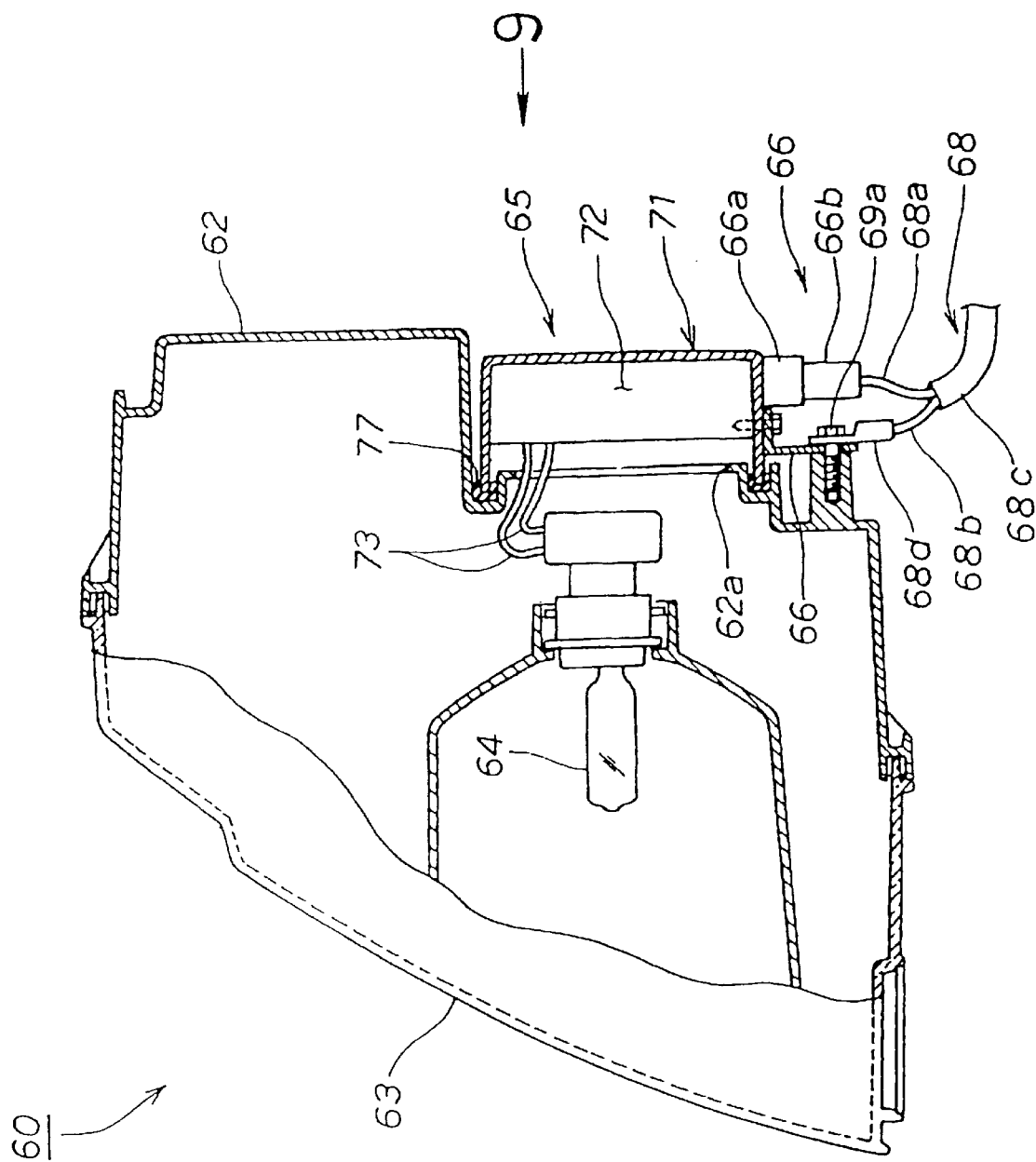
FIG. 8 is a side view of a fourth embodiment of the headlamp for a vehicle according to the present invention.

FIG. 8 is a side view of a fourth embodiment of the headlamp for a vehicle according to the present invention.

A headlamp 60 for a vehicle includes a lamp housing 62; a lens 63 provided for covering a front surface side of the lamp housing 62; a discharge lamp 64 removably contained in the lamp housing 62 at a position within the lens 63; a lighting circuit unit 65, mounted in such a manner so as to cover an opening portion 62a provided in a rear surface of the lamp housing 62, for lighting the discharge lamp 64. A cable coupler 66 is connected to the lighting circuit unit 65, for supplying power from a power supply to the lighting circuit unit 65. A harness 68, connected to the cable coupler 66, is provided for supplying power from the power supply to the cable coupler 66. A mounting screw 69a and a plurality of mounting screws 69b are provided as fastening members for mounting the lighting circuit unit 65 on the lamp housing 62. See FIG. 9.

The lighting circuit unit 65 is composed of a circuit case 71, and a circuit main body 72, provided in the case 71, for lighting the discharge lamp 64. The lighting circuit unit 65 also has two high voltage cords 73 for supplying a high voltage to the discharge lamp 64.

The cable coupler 66 is composed of a cord connector 66a and a plug 66b. The cord connector 66a is mounted to the circuit main body 72 in such a manner so as to pass through the circuit case 71, for supplying power from the power supply to the circuit main body 72. The plug 66b is fitted in the cord connector 66a and mounted to the harness 68.

Figure 9:
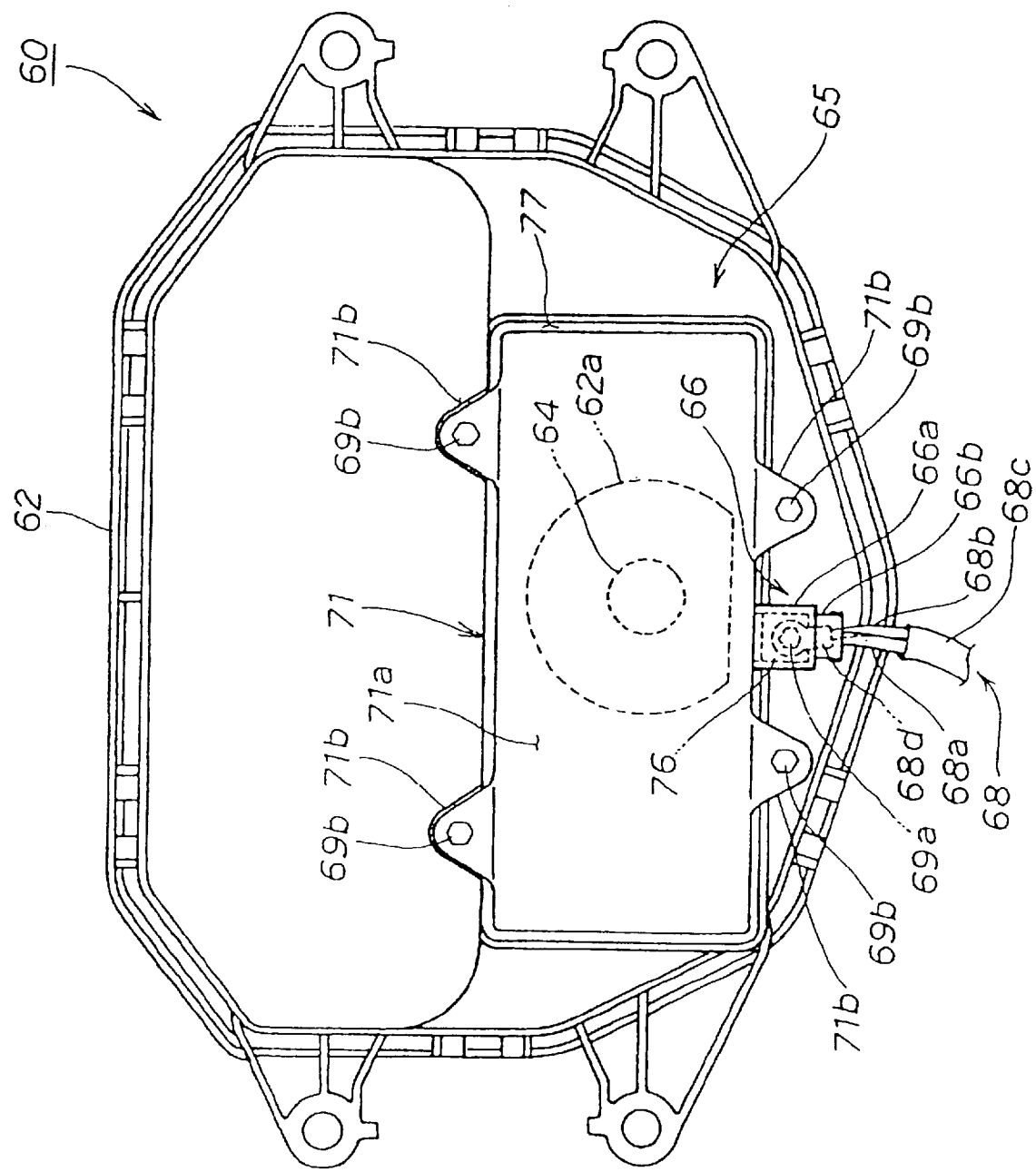
FIG. 9 is a view taken along arrow 9 of FIG. 8.

FIG. 9 is a plan view, taken along arrow 9 of FIG. 8, showing the fourth embodiment of the headlamp for a vehicle according to the present invention.

The harness 68 is composed of a plus side cord 68a, an earth wire 68b, and a covering portion 68c for covering the plus side cord 68a and the earth wire 68b. The plug 66b is provided at the leading end of the plus side cord 68a, and an earth terminal 69d is provided at the leading end of the earth wire 68b.

The circuit case 71 is composed of a case main body 71a, a plurality of mounting portions 71b for mounting the case main body 71a on the lamp housing 62, and an earth plate 76 for fixing the case main body 71a on the lamp housing 62 in cooperation with the mounting portions 71b. The circuit case 71 is mounted on the lamp housing 62 through a seal member 77, and in such a state, the mounting portions 71b of the circuit case 71 are fixed on the lamp housing 62 with the mounting screws 69b and also the earth plate 76 is fixed on the lamp housing 62 with the mounting screw 69a.

When the circuit case 71 is mounted on the lamp housing 62, the earth wire 68b is co-fastened with the earth plate 76 by means of the mounting screw 69a and also the mounting screw 69a is covered with the plug 66b of the cable coupler 66.

Although in the first, second, third and fourth embodiments, the cord connector of the cable coupler is mounted on the lighting circuit unit and the plug is mounted on the harness, the present invention is not limited thereto. That is, the plug may be mounted on the lighting circuit unit and the cord connector may be mounted to the harness.

Further, although description is made using the headlamp for a vehicle contaning only the discharge lamp in the first, second, third, and fourth embodiments, the present invention can be applied to a combination lamp containing a halogen lamp.

In the second, third, and fourth embodiment, the mounting screws 29a and 29b (see FIG. 5), mounting screws 49a and 49b (see FIG. 7) and mounting screws 69a and 69b (see FIG. 9) are used as the fastening members; however, the fastening members may be represented by any of bolts, small screws or tapping screws; stud bolts insertion-molded on the housing side in combination with nuts or clips.

According to the present invention, there is provided a headlamp for a vehicle including a lamp housing with a front surface side thereof being covered with a lens, the lamp housing having an opening portion in a rear surface thereof; a discharge lamp removably contained in the lamp housing; and a lighting circuit unit, mounted in such a manner so as to cover the opening portion from the rear surface side of the lamp housing, for lighting the discharge lamp. A cord connector and a plug are provided between the lighting circuit unit and the lamp housing, whereby when the lighting circuit unit is removed from the lamp housing, the cord connector is separated from the plug to thereby cut off the supply of power from a power supply to the lighting circuit unit. Accordingly, when the work of removing the lighting circuit unit is completed, the plug is necessarily separated from the cord connector, to thereby cut off the power supply to the lighting circuit unit. As a result, the power supply to the lighting circuit can be cut off whenever work is performed on the lamp housing.

According to the present invention, there is provided a headlamp for a vehicle, wherein the cord connector or the plug is directly connected to the lighting circuit unit.

The cord connector or the plug is directly mounted on the lighting circuit unit. Accordingly, when the lighting circuit unit is removed from the lamp housing, the power supply to the lighting circuit unit can be immediately cut off by being interlocked with the operation of removing the lighting circuit unit from the lamp housing.

According to the present invention, there is provided a headlamp for a vehicle, wherein in addition to a cable coupler composed of the cord connector and the plug for supplying power from the power supply to the lighting circuit unit, there is another cable coupler at a position on a power supply side from the cable coupler in order to removably connect the headlamp to a vehicle main body. As a result, the power supply to the lighting circuit unit can be cut off before removal of the lighting circuit unit from the lamp housing.

According to the present invention, there is provided a headlamp for a vehicle including: a lamp housing with a front surface side thereof being covered with a lens, the lamp housing having an opening portion in a rear surface thereof; a discharge lamp removably contained in the lamp housing; a lighting circuit unit, mounted in such a manner so as to cover the opening portion from the rear surface side of the lamp housing, for lighting the discharge lamp. A plurality of fastening members are provided for mounting the lighting circuit unit to the lamp housing. A plug or a cord connector is mounted at a position where it covers at least one of the fastening members. A harness is provided for supplying power from a power supply to the lighting circuit unit through a cable coupler composed of the plug and the cord connector. As a result, since the step of removing the harness for supplying power from the power supply to the lighting circuit unit is necessarily included in the step of removing the lighting circuit unit from the lamp housing, maintenance in the lamp housing can be performed even by a person who is not skilled in the removing procedure.

According to the present invention, there is provided a headlamp for a vehicle including a lamp housing with a front surface side thereof being covered with a lens, the lamp housing includes an opening portion in a rear surface thereof and a discharge lamp removably contained in the lamp housing. A lighting circuit unit, mounted in such a manner so as to cover the opening portion from the rear surface side of the lamp housing, for lighting the discharge lamp. A plurality of fastening members are provided for mounting the lighting circuit unit to the lamp housing. A harness is provided for supplying a power from a power supply to the lighting circuit unit. An earth wire in the harness is co-fastened with at least one of the fastening members. As a result, since the step of removing the earth wire in the harness is necessarily included in the step of removing the lighting circuit unit from the lamp housing, it is possible to automatically cut off the power supply to the lighting circuit unit.

According to the present invention, there is provided a headlamp for a vehicle, wherein a cable coupler is connected to the harness, and the fastening member co-fastened with the earth wire is covered with a plug or a cord connector of the cable coupler.

By removal of the lighting circuit unit from the lamp housing, the entire harness is removed from the lighting circuit unit, to thereby make the maintenance of the headlamp for a vehicle easier.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A headlamp for a vehicle comprising:
   a lamp housing with a front surface side and an opening portion in a rear surface thereof;
   a lens mounted on said front surface side of said lamp housing;
   a discharge lamp removably contained in said lamp housing;
   a lighting circuit unit, mounted for covering said opening portion from the rear surface side of said lamp housing and for providing an electrical connection for illuminating said discharge lamp; and
   a cord connector and a plug being provided between said lighting circuit unit and said lamp housing, whereby when said lighting circuit unit is removed from said lamp housing, said cord connector is separated from said plug for disconnecting an electrical connection to said lighting circuit unit.

2. The headlamp for a vehicle according to claim 1, wherein at least one of said cord connector and said plug is directly connected to said lighting circuit unit.

3. The headlamp for a vehicle according to claim 1, and further including a second cable coupler for disconnecting an electrical connection to enable a removably connection of said headlamp to a vehicle main body.

4. The headlamp for a vehicle according to claim 2, and further including a second cable coupler for disconnecting an electrical connection to enable a removably connection of said headlamp to a vehicle main body.

5. A headlamp for a vehicle comprising:
   a lamp housing with a front surface side and an opening portion in a rear surface thereof;
   a lens for covering the front surface side of said lamp housing;
   a discharge lamp removably contained in said lamp housing;
   a lighting circuit unit for covering said opening portion from the rear surface side of said lamp housing and for providing an electrical connection for illuminating said discharge lamp;
   a plurality of fastening members for mounting said lighting circuit unit to said lamp housing;
   at least one of a plug and a cord connector mounted at a position for being secured by at least one of said fastening members; and
   a harness for supplying an electrical connection to said lighting circuit unit through a cable coupler composed of said plug and said cord connector.

6. A headlamp for a vehicle comprising:
   a lamp housing with a front surface side and an opening portion in a rear surface thereof;
   a lens mounted on said front surface side of said lamp housing;
   a discharge lamp removably contained in said lamp housing;
   a lighting circuit unit, mounted for covering said opening portion from the rear surface side of said lamp housing and for providing an electrical connection for illuminating said discharge lamp;
   a plurality of fastening members for mounting said lighting circuit unit to said lamp housing;
   a harness for supplying an electrical connection to said lighting circuit unit; and
   an earth wire in said harness for being co-fastened with at least one of said fastening members.

7. The headlamp for a vehicle according to claim 6, wherein a cable coupler is connected to said harness, and said fastening member co-fastened with said earth wire is covered with at least one of a plug and a cord connector of a cable coupler operatively connected to said electrical connection.

8. A headlamp for a vehicle comprising:
   a lamp housing having a front portion and an opened rear portion;
   a lens mounted on said front portion of said lamp housing;
   a discharge lamp operatively positioned within said lamp housing and being removable for repair through said opened rear portion of said lamp housing;
   a lighting circuit unit, mounted for covering said opened rear portion of said lamp housing and for providing an electrical connection for said discharge lamp; and
   an electrical connector being operatively positioned between said lighting circuit unit and said lamp housing, whereby when said lighting circuit unit is removed from said lamp housing, said electrical connector is disconnected for disconnecting an electrical connection to said lighting circuit unit.

9. The headlamp for a vehicle according to claim 8, wherein said electrical connector is directly connected to said lighting circuit unit.

10. The headlamp for a vehicle according to claim 8, and further including a second electrical connection for disconnecting and removably mounting said headlamp to a vehicle main body.

11. The headlamp for a vehicle according to claim 9, and further including a second electrical connection for disconnecting and removably mounting said headlamp to a vehicle main body.

12. A headlamp for a vehicle comprising:
   a lamp housing with a front portion and an opened rear portion;
   a lens for covering the front portion of said lamp housing;
   a discharge lamp removably mounted in said lamp housing;
   a lighting circuit unit for covering said opened rear portion of said lamp housing and for providing an electrical connection for said discharge lamp;
   a plurality of fastening members for mounting said lighting circuit unit to said lamp housing;
   an electrical connection being mounted at a position for securing said lighting circuit to the lamp housing by at least one of said fastening members, said electrical connection requiring removal to access said at least one of said fastening members; and
   a harness operatively connected to said electrical connection and said lighting circuit unit through a cable coupler including a plug and a cord connector.

13. A headlamp for a vehicle comprising:
   a lamp housing with a front portion and an opened rear portion;
   a lens mounted on said front portion of said lamp housing;
   a discharge lamp removably positioned within said lamp housing;
   a lighting circuit unit, mounted for covering said opened rear portion of said lamp housing and for providing an electrical connection for said discharge lamp;

a plurality of fastening members for mounting said lighting circuit unit to said lamp housing;

a harness for supplying an electrical connection to said lighting circuit unit; and an earth wire being disposed in said harness for co-fastening with at least one of said fastening members.

14. The headlamp for a vehicle according to claim 13, wherein a cable coupler is connected to said harness, and said fastening member co-fastening with said earth wire is covered with at least one of a plug and a cord connector of a cable coupler operatively connected to said electrical connection.

\* \* \* \* \*